United States Patent
Kalwa et al.

(10) Patent No.: US 11,351,769 B2
(45) Date of Patent: Jun. 7, 2022

(54) PROCESS AND DEVICE FOR THE PRODUCTION OF LAYERED MATERIALS WITH SYNCHRONOUS-PORE EFFECT

(71) Applicant: Flooring Technologies Ltd., Kalkara (MT)

(72) Inventors: Norbert Kalwa, Horn-Bad Meinberg (DE); Joachim Hasch, Berlin (DE); Bernd Stiewe, Nieheim (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 17/072,167

(22) Filed: Oct. 16, 2020

(65) Prior Publication Data

US 2021/0039426 A1 Feb. 11, 2021

Related U.S. Application Data

(62) Division of application No. 16/210,251, filed on Dec. 5, 2018, now Pat. No. 10,899,167.

(30) Foreign Application Priority Data

Dec. 11, 2017 (EP) .................... 17 206 407

(51) Int. Cl.
| | | |
|---|---|---|
| *B32B 41/00* | (2006.01) | |
| *B44C 1/24* | (2006.01) | |
| *B44C 5/04* | (2006.01) | |
| *B41M 5/00* | (2006.01) | |
| *B32B 21/06* | (2006.01) | |
| *B41F 1/26* | (2006.01) | |
| *B44C 5/06* | (2006.01) | |
| *B44F 9/02* | (2006.01) | |

(52) U.S. Cl.
CPC .............. *B32B 41/00* (2013.01); *B32B 21/06* (2013.01); *B41F 1/265* (2013.01); *B41M 5/0005* (2013.01); *B44C 1/24* (2013.01); *B44C 5/043* (2013.01); *B44C 5/0469* (2013.01); *B44C 5/0492* (2013.01); *B44C 5/06* (2013.01); *B44F 9/02* (2013.01); *B32B 2451/00* (2013.01)

(58) Field of Classification Search
CPC ..... B44C 5/0469; B44C 5/0492; B44C 5/043; B44C 5/06; B44C 1/24; B32B 21/06; B32B 2451/00; B32B 41/00; B32B 2041/04; B32B 2041/06; B32B 38/06; B32B 38/1825; B32B 38/1833; B32B 38/1841; B32B 38/185; B32B 38/145; B41F 1/265; B41F 9/02; B41F 19/02; B41M 5/0005; E04F 15/02; B29C 66/961; B29C 66/97; B29C 59/026; B29C 59/046; Y10T 156/1023; Y10T 156/1039; Y10T 156/1041; B44F 9/02; B44B 5/026
See application file for complete search history.

(56) References Cited

U.S. PATENT DOCUMENTS

| | | | |
|---|---|---|---|
| 3,845,287 A * | 10/1974 | Fremont | G05D 22/02 |
| | | | 700/123 |
| 2008/0185092 A1 * | 8/2008 | Blenkhorn | B41M 1/24 |
| | | | 156/209 |
| 2009/0151851 A1 * | 6/2009 | Endert | B44B 5/026 |
| | | | 156/64 |
| 2013/0295352 A1 | 11/2013 | Thiers et al. | |
| 2017/0121983 A1 | 5/2017 | Durnberger | |
| 2017/0205225 A1 * | 7/2017 | Sonntag | G01B 21/08 |
| 2017/0297257 A1 | 10/2017 | Kackmann-Schneider et al. | |

FOREIGN PATENT DOCUMENTS

| | | |
|---|---|---|
| DE | 102004054765 A1 | 6/2005 |
| DE | 102014211769 A1 | 12/2015 |
| WO | 9731775 A1 | 9/1997 |
| WO | 2016050696 A1 | 4/2016 |

* cited by examiner

*Primary Examiner* — John L Goff, II
(74) *Attorney, Agent, or Firm* — The Webb Law Firm

(57) ABSTRACT

Disclosed is a process for the production of synchronous-pore layered materials. Also disclosed is a device for the conduct of the process. In further aspects, the invention relates to layered materials which can be produced by the process, and also to wood-composite boards equipped with the layered materials produced by the process of the invention.

24 Claims, No Drawings

PROCESS AND DEVICE FOR THE PRODUCTION OF LAYERED MATERIALS WITH SYNCHRONOUS-PORE EFFECT

CROSS-REFERENCE TO RELATED APPLICATION

This application is a division of U.S. patent application Ser. No. 16/210,251, filed on Dec. 5, 2018, now U.S. Pat. No. 10,899,167 which claims priority to European Patent Application No. 17 206 407.3 filed Dec. 11, 2017, the disclosures of which are hereby incorporated in their entireties by reference.

FIELD OF THE INVENTION

The invention relates to a process, in particular for the continuous production of layered materials with synchronous-pore effect. The invention moreover provides a device for the conduct of said process. In further aspects, the invention relates to layered materials which can be produced by said process, and also to wood-composite boards adhesive-bonded/coated with the layered materials produced by the process of the invention.

BACKGROUND OF THE INVENTION

During the production of products with decorative surfaces in a very wide variety of application sectors (furniture, floorcoverings, consumer articles, wall claddings and ceiling claddings, etc.), the designer and/or the producer is always attempting to achieve the closest possible approximation to the original that is to be replicated. The originals here are mostly patterns deriving from the natural world. These can be types of wood, types of stone, or other materials occurring in the natural world. Nowadays it is no longer sufficient here to replicate the decorative effect, this being possible without difficulty via digitization and printing by a digital printer on a very wide variety of substrates; instead, an additional requirement is that the decorative effect be combined with a surface that corresponds to the original in the natural world. The quality therefore now demanded here almost always involves registered embossing of structure coincident with decorative effect. However, this is not always easy to achieve, because in many cases the decorative surfaces comprise printed papers and these are subject to dimensional changes during the various production steps.

Achievement of the desired quality level (registered embossing) in these processes requires a very good level of coincidence between the printed and impregnated decorative paper and the structuring platen, structure-former or structuring belt. Attempts to adjust the impregnated decorative paper upstream of a continuous press (CPL press) are not successful because although these can lessen the width-increase problem they cannot eliminate it completely. The technology often used nowadays with printed marginal cut markings also fails to provide the required precision, because these can only be utilized for the correction of length changes. Variations of up to 10 mm in the accuracy of coincidence between printed decorative effect and structuring can be observed here.

A conventional production process for layered materials can be described as follows: The desired decorative effect is first applied by digital printing to a print-substrate paper which has a certain moisture content. The combination of the aqueous inks used here with the web tension in the printing machine leads to expansion of the paper in terms of both length and width. This is followed by drying of the inks by warm air, IR radiant sources, etc., and this sometimes leads to drying-out of the paper with attendant shrinkage of the printed paper. In the next production step, the paper is typically impregnated with an aqueous synthetic resin (e.g.: melamine resin) in an impregnation line. During this production step, again expansion of the printed paper initially occurs, caused by swelling and web tension. The paper is then redried in the drying duct to a processing moisture content of, for example, about 6% by weight, with a resultant reduction of the dimensional change to, for example, about 1.5% in terms of width and, for example, about 0.5% in terms of length. In the case of a paper web of 2 m width, the resultant increase is, for example, about 30 mm in terms of width and, for example, about 5 mm per running meter in terms of length. The printed, impregnated and dried paper is then either rolled up with a roll or divided into sheets. The roll product is then processed together with impregnated core plies and optionally an overlay in a continuous press (CPL press), the structure-former used here being either a structured belt or a structure-former based on lacquered papers. Alternatively, the sheet product, likewise with impregnated core plies, likewise optionally with an overlay, is processed with use of structured press platens or structure-formers in a stack press. Both processes use high pressures and high temperatures to achieve melting and crosslinking of the synthetic resins and thus of the individual impregnated papers.

In the prior art there are various approaches to achieve the desired quality level: DE 10 2004 054 765 A1 describes a process for the production of a decorative laminate in a batch process where camera-control is used to achieve coincidence between a decorative sheet, a base layer and a press platen. After lamination in a laminate press, a comparative camera array is used to detect the resultant arrangement of the decorative sheet with respect to the structure in the composite, and the arrangement data detected in the composite are provided by a computer as control data for the placing of the decorative sheet. No account is taken of the changes in the dimensions of the decorative sheet due to previous process steps such as printing, drying, impregnation, and redrying. The camera-controlled placing of the decorative sheet is therefore able merely to adjust the deviations between printed decorative effect and structuring. Said measure cannot ensure coincidence of printed decorative effect and structuring in the finished product.

WO 97/31775 describes a continuous process for the production of a decorative laminate where a structure-former matrix is brought into coincidence with corresponding decorative-effect sections of the decorative paper for the pressing procedure. The structure-former matrix can comprise various positioning means. The velocity of the structure-former matrix and/or of the decorative-paper web is controlled continuously by means of sensors, for example mechanical transmitters, scanners, photocells, CCD cameras, pneumatic sensors or the like, and of the positioning means, in order to obtain very precise coincidence between the decorative-effect structure and surface structure. However, again the process described in that document does not take account of dimensional changes of the decorative sheet caused by the abovementioned preceding process steps, and therefore does not take account of deviations of the dimensions of the decorative paper web from the dimensions of the structure-former. This is particularly disadvantageous here in the event of length changes of the decorative paper web, which accumulate along the length of the decorative paper web.

DESCRIPTION OF THE INVENTION

The conventional processes for the production of layered materials generally do not take account of dimensional changes of the carrier material during the individual production steps. This leads to quality defects in the achievement of a synchronous-pore effect (registered embossing), the final result of these being products not complying with the desired standard and/or, in the most unfavorable case, material losses and scrap.

The object of the invention therefore consisted in providing a process which can produce layered materials that achieve the required quality level, i.e. exhibit a synchronous-pore effect, and which can overcome the disadvantages of the processes known from the prior art. Specifically, the object consists in making the digital data of the printed decorative effect available for the subsequent process steps. Possibilities thus provided are intended to include continuous production of layered materials with synchronous-pore effect. The electronic data from the digital printing procedure are intended here to serve as aids for solving the problem; use of these data for comparison purposes, with the aid of sensors, permits detection of the positional changes of the decorative-effect details on the product web during the various production steps, and permits intervention for control purposes.

The object of the invention is achieved via provision of a production process for layered materials; this process can be summarized as follows:

A possible method of solving the problems described for conventional production processes consists in storage of decorative-effect data across the entire process and use of these data, if necessary, to influence changes to the process. The provision of digital data for the production of decorative surfaces for various products such as furniture, floors, panels, wall claddings, facades and other consumer items begins with provision of originals or motifs from a very wide variety of sources. Sources from which these derive can vary according to requirement: on the one hand, it is possible to utilize natural products such as wood or stone, and on the other hand it is also possible to use other originals produced by other printing techniques such as intaglio printing or screen printing, or else produced manually. The said originals are then digitized by using a scanner, the scanners used nowadays being capable of digitizing large-format originals in a single scan.

It is preferable in the invention to use digital printing for the further processing of the digital data. During the printing of the decorative paper, there is already information available concerning the print in relation to the width and length of the paper. After each processing step, this information can be compared with the original data. A first possibility therefore consists in making changes to process parameters immediately when deviations become apparent in the process. Secondly, there is also the possibility of alternative utilization of product batches that do not comply with specifications. In digital printing there is moreover the possibility, unlike in intaglio printing, of using software tools to adjust the print appropriately for the expansion behavior or shrinkage behavior of the paper.

The process of the invention is therefore based on maintaining availability of all of the decorative-effect data alongside the carrier material in the process. Sensors are used at all manufacturing stages for comparisons with the process steps upstream and/or downstream thereof. In the first step, a decorative print effect is applied to the carrier material, for example a print-substrate paper. The position of the print on the paper is captured here, for example by integrated length- and width-measurement devices. In the next production step (impregnation of the carrier material) the change of the dimensions of the carrier material in terms of length and width is determined after the drying procedure, and is accordingly compared with a prescribed standard value. This procedure preferably takes place at a location at which particularly precise measurements are possible, for example on chill rolls. Very precise measurement of both length and width is possible at that location because the entire area of the impregnated carrier material is pressed onto the chill rolls. The frequent problem of corrugated carrier materials, for which precise measurement of length and width is difficult, is thus avoided. When deviations arise, it is possible to alter the process parameters, for example drying, web tension, production rate, etc. In the event that these process changes do not provide a result complying with quality requirements, appropriate adjustment can be made to the print width for future orders. Integration of the digital printer, or of a printing line comprising the digital printer, into an appropriate device for the production of layered materials is advantageous. The arrangement then preferably has the digital printer upstream of the impregnation duct. It is then possible immediately, during the preferably continuous process, to compress the dimensions of the printed decorative effect in terms of length and/or width (in the event of expansion of the carrier material), and/or to expand same in terms of length and/or width (in the event of shrinkage of the carrier material). Products not achieving the required quality are detected during the course of process monitoring, and can be utilized for orders not involving registered embossing. In principle, therefore, it is possible to process all decorative papers. However, it is necessary in all cases to adjust the print appropriately for the structure of the structure-former or of the structuring belt. After the impregnation procedure, the decorative papers are rolled up. At the CPL press, where the impregnated carrier materials are laminated at high pressure and high temperatures, the data passed on together with the roll are utilized for the positioning of the decorative effect in relation to the structure-former or to the structuring belt. A point requiring attention here is that when a structure-former based on paper is used the drying-out of the structure-former causes shrinkage of the carrier material, whereas expansion takes place when a press platen is used. It is therefore possible, when order size changes, that the structure-forming element is also changed without any likelihood of quality defects. This can often be problematic during new introduction of decorative effects/decorative-effect families with identical structure. It is usual here to begin with a structure-former based on paper, because of uncertainty as to the future quantitative development of the decorative effect/the decorative-effect family. If then the decorative effect/the decorative-effect family develops to become successful in the market, a change is usually made to a structuring belt for cost reasons, and it is precisely this that leads to the problems described above.

The continuous comparison of the decorative-effect data with the structure-former or the structuring belt can correct not only variations in the impregnated carrier material but also transverse movement of the web of carrier material during the production process. After passage through the CPL press, the laminate can then be wound or directly divided to give cut-to-size products. Here again, the stored data updated to include the shrinkage of the laminate in the continuous press (CPL press) can be used.

The positional data of the printed decorative effect can also be used for subsequent finishing steps, internally or externally. This is particularly important for products dependent on precise cut formats, for example furniture fronts, floorcoverings and door leaves.

The process of the invention is particularly advantageous because quality improvement in the production of the synchronous-pore effects results in production of substantially less scrap and facilitates or improves the further processing of the layered materials.

In a preferred embodiment of the invention, the dimensions of the printed decorative effect produced by means of digital printing on a carrier material are adjusted in a manner that takes into account the dimensional changes of the printed decorative effect during the abovementioned processing steps. To this end, measurements are first made of the dimensions of the structure-former and of the carrier material before implementation of the digital printing procedure. Deviations of the dimensions of the carrier material from the dimensions of the structure-former are determined and utilized for the calculation of at least one correction factor K. This at least one correction factor K is communicated to the digital printer and used for appropriate adjustment of the dimensions of the decorative effect during the digital printing procedure.

Suitable carrier material for the process for producing layered materials in the invention is any material which can be printed by a digital printer and generally by aqueous inks and preferably can be rolled up after the digital printing procedure and drying of the printed decorative effect. It is preferable to use, as carrier material, printer paper with weight per unit area in the range from 60 to 80 g/m$^2$. For products of very high quality it is also preferable to use printed paper with weight per unit area in the range from 100 to 110 g/m$^2$.

In a particularly preferred embodiment, the invention provides a process for the production of synchronous-pore layered materials, comprising the steps of:
a) production of a layered material, comprising the steps of
  i. printing of a carrier material, preferably of a decorative paper, by means of digital printing and storage of the print data and/or positional data of the printed decorative effect;
  ii. drying of the printed carrier material;
  iii. application and drying of an impregnation material onto the printed carrier material;
  iv. production of a layered material, comprising the pressing of the printed and impregnated carrier material together with impregnated core plies and optionally an overlay and optionally a protective layer, with use of a structure-former;
b) measuring of the dimensions of the structure-former;
c) measuring of the dimensions of the carrier material;
d) determination of deviations of the dimensions of the carrier material from the dimensions of the structure-former;
e) calculation of at least one correction factor K;
f) communication of the at least one correction factor K to the digital printer;
g) use of the at least one correction factor K for appropriate adjustment of the dimensions of the decorative effect during the digital printing procedure.

In another embodiment of the invention, the correction factor K to be determined is specific for the printer paper used as starting material. Care is therefore taken in the invention that, as far as possible, printer paper with the same specification from the same producer is always used as starting material, because printer papers from different producers can have different compositions, which can lead to different dimensional changes of the printer paper during the printing procedure and the subsequent drying of the decorative print effect. The correction factor K can also be dependent on the quantity applied of the aqueous printer ink during the digital printing procedure. The greater the quantity of the aqueous ink applied, the greater the dimensional changes of the printer paper. In another embodiment of the invention, the correction factor K is therefore also specific for a particular printed decorative effect.

The layered material to be produced by the process of the invention is preferably a laminate, particularly preferably a high-pressure laminate (known as HPL). These laminates are composed of a plurality of layers of paper with a resin coating, these having been combined under high pressure. A plurality of melamine- and phenolic-resin-impregnated papers are hot-pressed with one another and optionally with an outer layer.

The structure-former is either a structure-former based on paper, a structuring belt or a press platen. Structure-formers based on paper are suitable for continuous production of the layered material. For larger batch sizes, structuring belts of a continuous press (CPL press) are also used. Press platens are constituents of stack presses which are used in the batch process for the production of layered materials in smaller formats.

There are various possible methods for measuring the dimensions of the structure-former and of the carrier material. In an embodiment of a process of the invention, the dimensions of the structure-former and of the carrier material are measured with reference to the longitudinal repeat distance and/or the transverse repeat distance. Additionally or alternatively, the dimensions of the structure-former and of the carrier material can be measured with the aid of positional marks applied on the structure-former or on the printed decorative effect. In a preferred embodiment of the process of the invention, these positional marks are selected from a control mark on the printed decorative effect and/or the structure-former, a raster mark on the printed decorative effect and/or the structure former and what is known as a cutblock. The control marks and the raster mark are usually positioned at the repeat distance. The cutblock is generally positioned on the reverse side of the layered material and serves for correct positioning of cutting equipment, for example a clipper, when the intention is to divide the continuously produced layered materials into smaller formats after production. It has proven to be particularly advantageous to make measurements of the dimensions of the structure-former after at least one passage of the structure-former through a heated press (for example at 200° C.), because the structure-former undergoes a dimensional change during heating, and does not achieve constant dimensions typical of the process until an operating temperature has been reached, which is then intended to form the basis for the determination of the correction factor K.

Dimensional changes of the structure-former and of the carrier material can occur during the process both in terms of length and in terms of width. It is therefore preferable that in step d) of a process of the invention deviations in the length and/or the width of the carrier material from the length and/or the width of the structure-former are determined.

As described above, deviations of the dimensions of the carrier material can occur at all of the manufacturing stages of the steps a) i. to a) iv. In a particularly preferred embodiment of the invention, therefore, in all of the manufacturing stages of the steps a) i. to a) iv., deviations of the length and/or the width of the carrier material from the length and/or the width of the structure-former are determined according to step d). This procedure firstly permits the utilization of these determined deviations for a more precise calculation of the correction factor K; secondly, the dimensional deviations determined at the individual manufacturing stages can also be utilized in order to undertake changes of the process parameters in the respective process steps situated upstream or downstream thereof. To this end, the determined deviations and calculated correction factors are preferably stored in control equipment or on a data carrier for subsequent use.

The aim is to determine a correction factor K which has high precision and as far as possible takes into account all of the dimensional changes of the structure-former and in particular of the carrier material at all process stages. It has proven advantageous here to determine partial correction factors k for each process stage at which dimensional changes, in particular of the carrier material, can occur.

In an embodiment of the process of the invention, therefore, measurements are made of deviations in the length and/or the width of the carrier material from the length and/or the width of the structure-former after application of the printed decorative effect to the carrier material. A partial correction factor $k_a$ is determined with reference to these measured dimensional changes.

In another embodiment of the process of the invention, measurements are made of deviations in the length and/or the width of the carrier material from the length and/or the width of the structure-former after drying of the decorative print effect. A partial correction factor $k_b$ is determined with reference to the dimensional changes measured at this process stage.

In another embodiment of the process of the invention, measurements are made of deviations in the length and/or the width of the carrier material from the length and/or the width of the structure-former after the application and drying of the impregnation material onto the printed carrier material. A partial correction factor $k_c$ is determined with reference to the dimensional changes measured at this process stage. After application of the impregnation resin and drying of the impregnation material, the carrier material is cooled. The cooling usually takes place on a chill roll. It is preferable that the correction factor $k_c$ is determined on the chill rolls. Very precise measurement of both length and width is possible at that location because the entire area of the impregnated carrier material is pressed onto the chill rolls. The frequent problem of corrugated carrier materials, for which precise measurement of length and width is difficult, is thus avoided. It is moreover possible with the process of the invention to produce layered materials continuously in web form. For the first time, registered embossing can also be reliably used throughout substantial lengths of roll product. There is no longer any requirement for clipping (cutting) into smaller formats. Rolls are moreover more versatile than sheet product in downstream processing.

In another embodiment of the process of the invention, measurements are made of deviations in the length and/or the width of the carrier material from the length and/or of the width of the structure-former after passage through one or more further steps. Further partial correction factors can be determined with reference to the dimensional changes in this or these further step(s). Further steps at which deviations in length and/or the width of the carrier material from the length and/or the width of the structure-former can occur are by way of example the application of a protective layer to the carrier material or the pressing of the layered material to form a laminate at high pressure and high temperature, in either a continuous press (CPL press) or a stack press.

A protective layer is by way of example a protective foil which protects the layered material from damage in subsequent processing steps, for example during the application of the layered material to a wood-composite board and the cutting-to-size of the wood-composite board.

The pressure in the continuous press is suitably in the range from 5 to 90 bar, preferably in the range from 15 to 70 bar. The temperature is typically in the range from 140 to 260° C., preferably in the range from 160 to 200° C.

In another embodiment of the process of the invention, by way of example, measurements are made of deviations in the length and/or width of the carrier material from the length and/or the width of the structure-former after the press procedure. A partial correction factor $k_d$ resultant therefrom is determined here.

In a particularly preferred embodiment of the process of the invention, the correction factor K is calculated from formula (I):

$$K = k_a + k_b + k_c + k_d \tag{I}$$

where $k_a$, $k_b$, and $k_c$ are defined as described above;

$k_d$ can be present or absent, and if present is the partial correction factor resulting from one or more further process steps; by way of example from the press procedure and $k_a$, $k_b$, $k_c$ and $k_d$ respectively mutually independently can be 0 or a positive or negative number in percent.

If one or more of the partial correction factors $k_a$, $k_b$, $k_c$, $k_d$ is/are 0 (zero), there were no measurable dimensional changes of the carrier material after passage through the respective process stage(s).

If one or more of the partial correction factors $k_a$, $k_b$, $k_c$, $k_d$ is/are a negative number, shrinkage of the carrier material was measurable after passage through the respective process stage(s).

If one or more of the partial correction factors $k_a$, $k_b$, $k_c$, $k_d$ is/are a positive number, expansion of the carrier material was measurable after passage through the respective process stage(s).

Accordingly, if the correction factor K is a positive number the dimensions of the decorative effect in the digital printing procedure are compressed to the extent of the absolute value of correction factor K in %. In the other case, if K is a negative number, the decorative effect is expanded in the digital printing procedure to the extent of the absolute value of K in %.

In another particularly preferred embodiment of the process of the invention, the partial correction factors are calculated mutually independently from formula (II):

$$k_x = \left(\frac{D2}{D1} * 100\%\right) - 100\% \tag{II}$$

where $k_x$ is a partial correction factor selected from $k_a$, $k_b$, $k_c$, and $k_d$;

D2 is the length or width of the carrier material after implementation of the respective process step a) i. to a) iv; and D1 is the length or width of the structure-former, and D1 and D2 are the length of carrier material and of structure-former, or are the width of the carrier material and structure-former.

The respective partial correction factors can in each case be calculated for the change of length or the change of width of the carrier material after passage through the respective process stage. It is thus possible to calculate the correction factor K separately for the length change or the width change of the carrier material. It is therefore preferable that the invention provides a correction factor $K_L$ for the length change and a correction factor $K_W$ for the width change of the carrier material, where $K_L$ and $K_W$ are calculated with reference to the formulae (I) and (II).

It is now possible, by means of the correction factor K, preferably of the correction factor $K_L$ in respect of the length, and/or of the correction factor $K_W$ in terms of the width, to compress or expand the dimensions of the printed decorative effect in the digital printing procedure. The calculation of separate correction factors $K_L$ for the length change and $K_W$ for the width change of the carrier material is particularly advantageous because the user of the process of the invention has all of the possibilities for appropriate adjustment of the dimensions of the printed decorative effect: the length or the width of the printed decorative effect can be adjusted appropriately, i.e. expanded or compressed, separately from one another. The length and the width of the printed decorative effect can also be simultaneously adjusted appropriately, where one dimension of the printed decorative effect, for example the length, can be compressed and the other dimension of the printed decorative effect, for example the width, can likewise be compressed or else can also be expanded.

With this procedure it is possible to produce synchronous-pore layered materials of highest quality while reliably achieving the required quality level of coincidence of structure and decorative effect (registered embossing).

As mentioned above, the process of the invention also provides, in the event of deviations in the dimensions of the carrier material from the dimensions of the structure-former, in one or more process steps, the possibility of utilizing the partial correction factors determined in order to control process parameters and thus to compensate the deviations determined in the dimensions of the carrier material in upstream or downstream process steps. Examples of process parameters that can be controlled are temperature, duration and intensity of the drying of the decorative print effect or of the carrier material after the impregnation procedure, web tension during the entire process, production rate, and also pressure and press temperature in the press equipment.

Greater intensity of drying of the decorative print effect or of the carrier material after the impregnation procedure leads to greater compression of the carrier material and can by way of example be utilized in order to compensate unusually high expansion of the carrier material occurring after the decorative printing procedure.

Increase of web tension leads to an intended expansion of the carrier material in longitudinal direction and can by way of example be utilized in order to compensate unusually high compression of the carrier material in the drying steps described above, etc. Other control possibilities arising here from the process of the invention are familiar to the person skilled in the art.

It is preferable to produce the layered material in the form of a laminate, particularly preferably of a high-pressure laminate in a continuous process in a continuous press (CPL press). The process of the invention can in principle also be implemented batchwise. Production of the layered material in the form of laminate, particularly preferably in the form of high-pressure laminate, then takes place in a stack press.

As described above, positional marks are provided to the structure-former and the carrier material. In an embodiment of the invention, the positional marks can be utilized in order to undertake the positioning of the printed decorative effect in a correct manner in relation to the structure-former in the press.

With the aid of the positional marks it is also possible to correct transverse movement of the decorative paper or of the layered material during the production process. To this end, it is preferable that continuous comparison of the positional marks of the structure-former and of the printed carrier material takes place.

After the press procedure in the CPL press the printed carrier material, optionally provided with an overlay, can be rolled up and provided in this form for further utilization. Alternatively, the printed carrier material, optionally provided with an overlay, can be converted to smaller formats by means of cutting-to-size equipment. The positioning of the carrier material for the production of smaller formats in the cutting-to-size equipment, in particular the positioning of the clipper, is preferably undertaken with reference to a positional mark applied on the reverse side of the carrier material. In a particularly preferred embodiment, the cut-block is used here.

In a further aspect, the invention provides a layered material, in particular a high-pressure laminate, which can be produced by the process of the invention, preferably by the continuous process. The high-pressure laminate of the invention is like conventional high-pressure laminates in having the following layers:

one or more impregnated core plies, for example from 1 to 6 core plies;

an impregnated and printed carrier material, for example a decorative paper;

optionally an overlay; and optionally a protective layer.

However, the high-pressure laminate produced by the process of the invention differs from conventional products, in particular if it has been produced by the continuous process, in that it exhibits a synchronous-pore effect, preferably with substantially improved quality, i.e. with improved coincidence of decorative effect and structure.

In a further aspect, the invention provides wood-composite boards equipped with the layered material, in particular the high-pressure laminate, produced by the process of the invention. These wood-composite boards are for example selected from functionalized MDF, HDF, furniture boards, furniture fronts, worktops, door fronts, floorcoverings, etc.

The invention moreover provides a device for the, preferably continuous, production of synchronous-pore layered materials. In an embodiment, the device of the invention comprises at least one printing line with at least one digital printer for the production of a printed decorative effect on a carrier material. The device of the invention moreover comprises at least one means for the drying of the carrier material after the digital printing procedure. The drying usually takes place in a drying duct by means of warm air, IR radiant sources or the like. For the production of the laminate, in particular of the high-pressure laminate, the device of the invention comprises a press, preferably a CPL press, for continuous lamination, or alternatively a stack press for the pressing of smaller formats by the batch process.

After drying of the printed decorative effect applied by the digital printer, the carrier material is impregnated. A melamine-formaldehyde resin is usually used for the impregnation of the carrier material. The device of the invention therefore also comprises at least one means for the impregnation of the carrier material and at least one means for the drying of the carrier material after the impregnation material has been applied.

The drying of the carrier material after the impregnation material has been applied is carried out at high temperature, for example in a drying duct by means of warm air and/or by means of IR radiant sources. For further processing, in particular in the continuous process, it is necessary to cool the impregnated and dried carrier material. To this end, the device of the invention can comprise a means for the cooling of the carrier material. In this case, the means for the cooling of the carrier material is a chill roll used for the onward conduct of the impregnated carrier material.

In order to permit production of a layered material with a plurality of layers, the device of the invention comprises appropriate means for the introduction, to the press, of a printed carrier material, of at least one impregnated core ply, optionally of a structure-former, optionally of an impregnated overlay and optionally of a material for the production of a protective layer.

The overlay can be a melamine-resin-impregnated material optionally equipped with abrasion-resistant particles. The abrasion-resistant particles are preferably selected from the group comprising aluminum oxides, corundum, boron carbides, silicon dioxides, silicon carbides and glass spheres.

Layered materials which can be produced by the device of the invention or by the process of the invention comprise one or more impregnated core plies. Soda craft papers equipped with a heat-curable resin are generally used as core plies. The device of the invention is equipped with a number of input units for the core plies corresponding to the desired number of core plies. In an embodiment, the device of the invention can have from 1 to 6 input units for core plies.

A structured belt of the continuous press (CPL press) can be used as structure-former. Alternatively, a structure-former based on a lacquered paper is used, and is introduced during the continuous press procedure. In this case, the device of the invention is equipped with an input device for the structure-former based on paper.

The device of the invention moreover comprises at least one means for the measurement of the dimensions of the structure-former and at least one means for the measurement of the dimensional changes of the carrier material. There can be one or more measurement means arranged after the digital printer, after the means for drying of the print, after the means for impregnation and drying of the carrier material, for example on the chill roll, and after the press.

Suitable measurement means are by way of example sensors, for example length sensors and width sensors, or cameras. It is also possible to determine the dimensions of the layered material, for example after discharge from the press, by means of a scanner and to undertake the subsequent evaluation of the scanned data in control equipment.

In another embodiment, the device of the invention comprises at least one control unit. The control unit advantageously uses the partial correction factors and correction factors determined by the process of the invention to control the process parameters, for example drying, web tension, production rate, press pressure and press temperature, and of the digital printing procedure. In an alternative embodiment, the device of the invention comprises a separate control unit for the control of the digital printing procedure, in particular for the appropriate adjustment of the dimensions of the printed decorative effect (compression, expansion). The control unit is by way of example a process computer, other computer or the like.

In another embodiment, the device of the invention comprises, as required by the desired subsequent processing of the resultant layered material, a means for the roll-up of the layered material produced in a continuous process. Alternatively or in addition, the device of the invention can comprise cutting-to-size equipment for the production of smaller formats.

The device of the invention is particularly advantageous because quality improvement in the production of the synchronous-pore effects results in production of substantially less scrap and facilitates or improves the further processing of the layered materials.

The invention is explained in more detail below with reference to an inventive example:

Inventive Example 1

A structure-former provided with a wood structure for registered embossing was first measured in relation to longitudinal and transverse repeat distance. These measurements were made after the structure-former had been passed once through a heated CPL press (about 200° C.). The measurements were made with the aid of markings which had been applied on the structure-former. In the second step, a digitally printed decorative paper selected for the structure-former was impregnated in an impregnation system. The decorative paper was a white paper with weight per unit area 80 g/m². It was assumed here that a width increase of 1.4% and a length increase of 0.5% had already occurred during the digital printing procedure, i.e. that the decorative effect was compressed by the corresponding percentages during the digital printing procedure. During printing of the paper, the print data and positional data had been stored. When the dimensional change of the paper was checked at the detection device of the impregnation duct by way of the stored decorative and, respectively, positional data, it was found that the width increase was 1.6% and that the length increase was 0.5%. In a further print trial, the width of the digital print was compressed by +0.2%. The paper was in turn impregnated and subjected to measurement at the detector. It was found here that the length increase and width increase were indeed within the desired range. The impregnated paper was then processed in the CPL press. Here again, positional data and/or data relating to the decorative effect were utilized to achieve synchronization of decorative effect and structure-former. After processing of the impregnated decorative paper together with impregnated core plies (soda kraft paper) and an impregnated overlay, it was found that the detector downstream of the CPL press that the decorative patterning coincided with the structure of the structure-former.

The invention claimed is:

1. A device for the production of synchronous-pore layered materials, comprising:
    at least one printing line for the production of a printed decorative effect on a carrier material, the at least one printing line comprising at least one digital printer;
    at least one means for drying of the carrier material after printing of the printed decorative effect;
    at least one means for impregnation of the carrier material with a resin;
    at least one means for drying of the carrier material after impregnation with the resin;

a press, the press being configured to have the carrier material, at least one impregnated core ply, and a structure-former introduced therein, the press being further configured to have an impregnated overlay or a material for production of a protective layer introduced therein;

at least one means for measurement of the dimensions of the structure-former, configured to make measurements of the dimensions of the structure-former after at least one passage of the structure-former through the press;

at least one means for measurement of dimensional changes of the carrier material; and at least one set of control equipment, wherein said at least one set of control equipment comprises a separate control unit for controlling a digital printing procedure.

2. The device of claim 1, wherein said structure-former comprises at least one of a structure-former based on paper, a structuring belt, or a press plate.

3. The device of claim 1, wherein said device is configured for a continuous production of synchronous-pore layered materials.

4. The device of claim 3, further comprising a means for cooling of the carrier material.

5. The device of claim 4, wherein said cooling means comprises a chill roll used for onward conduct of the impregnated carrier material.

6. The device of claim 3, wherein said press comprises a continuous press.

7. The device of claim 3, further comprising a roll for roll-up of a structure-former based on paper or a structuring belt.

8. The device of claim 3, further comprising a roll for roll-up of the synchronous-pore layered material produced in the continuous production.

9. The device of claim 1, wherein said device is configured for a batch production of synchronous-pore layered materials.

10. The device of claim 9, wherein said press comprises a stack press.

11. The device of claim 9, further comprising cutting-to-size equipment for production of smaller formats in the batch production.

12. The device of claim 11, wherein said cutting-to-size equipment is configured to position the carrier material for the production of smaller formats in the cutting-to-size equipment by reference to a positional mark.

13. The device of claim 1, wherein said at least one means for drying comprises a drying duct, which is configured to dry the carrier material after printing of the printed decorative effect by using warm air or IR radiant sources.

14. The device of claim 1, wherein the press is configured to have up to six impregnated core plies introduced therein.

15. The device of claim 1, comprising one or more measurement means arranged after the digital printer, after the means for drying of the print, after the means for impregnation and drying of the carrier material, and/or after the press.

16. The device of claim 15, wherein said measurement means comprises one or more sensors, one or more cameras, or one or more scanners.

17. The device of claim 15, wherein said measurement means comprises a scanner, which is configured to determine the dimensions of layered material.

18. The device of claim 15, wherein said measurement means are configured to measure the dimensions of the structure-former and of the carrier material with reference to a longitudinal repeat distance and/or a transverse repeat distance and/or with aid of positional marks.

19. The device of claim 1, wherein said at least one set of control equipment comprises a process computer.

20. The device of claim 1, wherein said at least one set of control equipment is configured to control process parameters, wherein said process parameters comprise at least one of drying, web tension, production rate, press pressure, or press temperature.

21. The device of claim 1, wherein controlling of the digital printing procedure comprises appropriate adjustment of dimensions of the printed decorative effect.

22. The device of claim 1, which is configured to perform a production process of synchronous-pore layered materials, comprising the steps of:
   a) producing a layered material, comprising the steps of
     i. printing a carrier material by digital printing and storing print data and/or positional data of a printed decorative effect;
     ii. drying the printed carrier material;
     iii. applying and drying an impregnation material onto the printed carrier material; and
     iv. producing a layered material, comprising pressing the printed and impregnated carrier material together with impregnated core plies and optionally an overlay and optionally a protective layer, with the use of the structure-former;
   b) measuring the dimensions of the structure-former;
   c) measuring the dimensions of the carrier material;
   d) determining deviations of the dimensions of the carrier material from the dimensions of the structure-former;
   e) calculating at least one correction factor K, wherein
     measurements are made of deviations in the length and/or the width of the carrier material from the length and/or the width of the structure-former after application of the printed decorative effect to the carrier material, and a partial correction factor $k_a$ is determined with reference to these dimensional changes;
     and
     measurements are made of deviations in the length and/or the width of the carrier material from the length and/or the width of the structure-former after drying of the printed carrier material, and a partial correction factor $k_b$ is determined;
     and
     measurements are made of deviations in the length and/or the width of the carrier material from the length and/or the width of the structure-former after the application and drying of the impregnation material onto the printed carrier material, and a partial correction factor $k_c$ is determined,
     and
     the correction factor K is calculated from formula (I):

$$K = k_a + k_b + k_c + k_d \qquad (I),$$

where
     $k_d$ can be present or absent, and if present is the partial correction factor resulting from one or more further process steps; and
     $k_a$, $k_b$, $k_c$ and $k_d$ respectively mutually independently can be 0 or a positive or negative number in percent;
   f) communicating the at least one correction factor K to the digital printer; and
   g) using the at least one correction factor K for appropriate adjustment of the dimensions of the decorative effect during the digital printing step.

23. The device of claim 22, wherein said device is configured to perform measurements of deviations in a length and/or width of the carrier material from a length and/or width of the structure-former after the pressing procedure, and to determine a resultant partial correction factor $k_d$.

24. The device of claim 22, wherein said device is configured to compress or expand the dimensions of the printed decorative effect during the digital printing step by using a correction factor $K_L$ in respect of a length and/or of a correction factor $K_W$ in respect of a width.

* * * * *